US007275713B2

(12) United States Patent
Hillsamer et al.

(10) Patent No.: US 7,275,713 B2
(45) Date of Patent: Oct. 2, 2007

(54) JACK APPARATUS

(75) Inventors: Tim Hillsamer, Mesa, AZ (US); Kenneth R. MacGregor, Mesa, AZ (US); Andrew Richard Zimmerle, Jr., Mesa, AZ (US)

(73) Assignee: The Boeing Company, Chicago, IL (US)

( * ) Notice: Subject to any disclaimer, the term of this patent is extended or adjusted under 35 U.S.C. 154(b) by 121 days.

(21) Appl. No.: 11/153,591

(22) Filed: Jun. 15, 2005

(65) Prior Publication Data

US 2006/0284145 A1 Dec. 21, 2006

(51) Int. Cl.
*B64C 25/50* (2006.01)

(52) U.S. Cl. ........................................................ 244/50

(58) Field of Classification Search .................. 244/50, 244/116; 254/8 B, 7 R, 10; 180/14.1, 904
See application file for complete search history.

(56) References Cited

U.S. PATENT DOCUMENTS 1,661,791 A * 3/1928 Dutro ......................... 254/7 R
1,697,364 A * 1/1929 McCollum et al. ......... 414/678
3,844,421 A * 10/1974 Nielsen ...................... 414/678
4,488,612 A * 12/1984 Patterson ................... 180/14.1
5,056,624 A * 10/1991 Georges ..................... 187/272
5,056,981 A * 10/1991 Knowles ..................... 414/495
5,135,346 A * 8/1992 Roach ........................ 414/495
6,986,503 B2 * 1/2006 Arzouman .................. 254/8 B

* cited by examiner

*Primary Examiner*—Tien Dinh
(74) *Attorney, Agent, or Firm*—Lee & Hayes, PLLC

(57) ABSTRACT

A jack apparatus for lifting an aircraft having landing gear including snow skis comprising a generally rectangular base having a first end, a second end opposite the first end, and at least two lateral members extending between the ends. The base is sized and shaped for positioning between the snow skis. The apparatus further includes a lift having a base end pivotally connected to the base adjacent its second end and a lifting end opposite the base end. The apparatus also includes a slide slidably connected to the base and a brace having an upper pivot end pivotally connected to the lift and a lower pivot end pivotally connected to the slide. In addition, the apparatus includes an actuator connected between the base and the slide for sliding the slide along the base.

13 Claims, 7 Drawing Sheets

FIG. 6
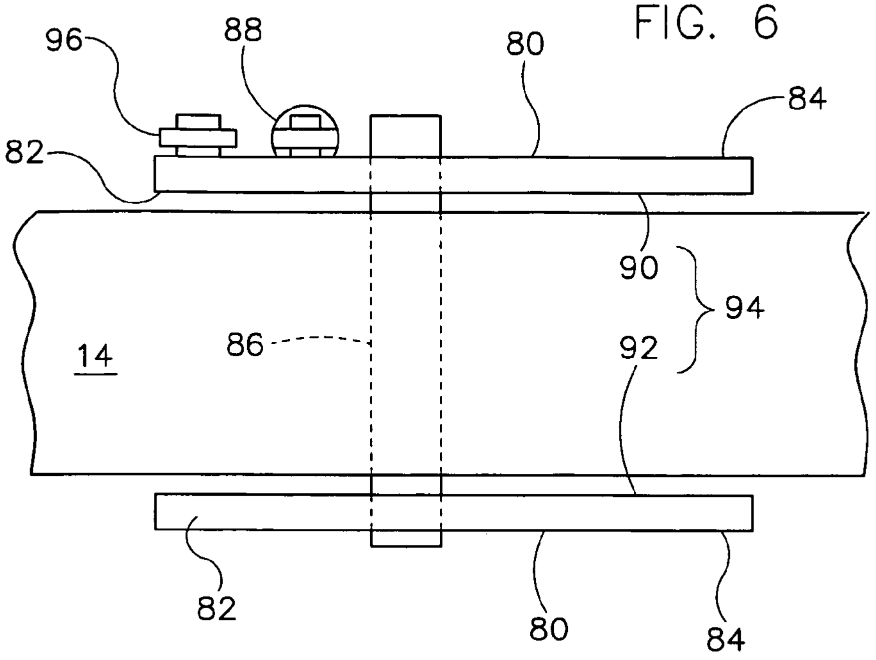
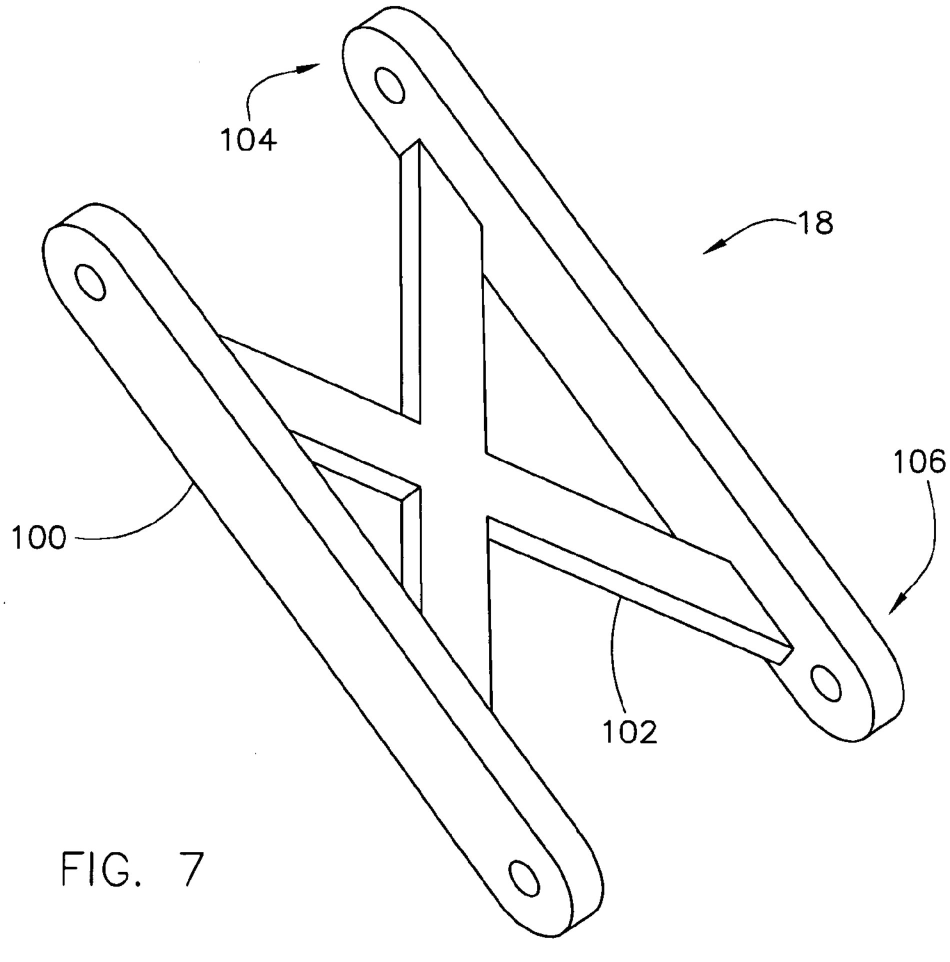
FIG. 7

JACK APPARATUS

BACKGROUND OF THE INVENTION

The present invention relates to a jack apparatus, and more particularly to a jack apparatus for lifting an aircraft having snow skis.

It is sometimes necessary to lift an aircraft off the ground during manufacture and/or the life of the aircraft. During manufacture, for example, an aircraft may need to be lifted for making final alterations to landing gear or an underside of the aircraft. One reason to lift an aircraft during its life is to make repairs, such as fixing a flat tire.

A common device used to lift aircraft is a tripod jack. Tripod jacks generally include a single aircraft interface point extending above a three legged base. Many aircraft require concurrent use of two or more tripod jacks to lift them. For example, to lift a fuselage of a helicopter, two tripods are usually used, where each tripod contacts one of two jack lifting points on the fuselage. In such applications, tripod jacks are positioned below the helicopter and between the landing gear so their bases do not interfere with each other and the landing gear.

Use of traditional tripod jacks for lifting aircraft has drawbacks. One drawback is the amount of time and energy required to lift the aircraft. For example, when two or more tripod jacks are used to lift the aircraft, an operator usually must incrementally raise each jack a small amount and repeat the incremental raising until the aircraft is lifted. This practice is time and energy intensive. Another drawback of using multiple tripod jacks to lift aircraft is the lack of space to position two tripod jacks as required to lift the aircraft when add-on items are attached. For instance, when snow skis are attached to the landing gear of some helicopters, the amount of space between the skis is insufficient to accommodate the bases of two adjacent traditional tripod jacks.

BRIEF SUMMARY OF THE INVENTION

The present invention relates to a jack apparatus for lifting aircraft having a fuselage and landing gear extending from the fuselage including snow skis. The apparatus comprises a generally rectangular base having a first end, a second end opposite the first end, and at least two lateral members extending between the first and second ends. The base is sized and shaped for positioning between the snow skis of the landing gear. The apparatus further includes a lift having a base end pivotally connected to the base adjacent its second end and a lifting end opposite the base end. The apparatus also includes a slide slidably connected to the base and a brace having an upper pivot end pivotally connected to the lift and a lower pivot end pivotally connected to the slide. In addition, the apparatus includes an actuator operatively connected between the base and the slide for sliding the slide along the base thereby pivoting the brace and the lift with respect to the base to selectively raise and lower the lifting end of the lift to raise and lower the aircraft.

In another aspect, the present invention includes a jack apparatus for lifting an object comprising a generally rectangular base having a first end, a second end opposite the first end, and at least two lateral members extending between the first and second ends. The apparatus further includes a lift having a base end pivotally connected to the base adjacent its second end and a lifting end opposite the base end. The apparatus also includes a slide slidably connected to the base and a brace having an upper pivot end pivotally connected to the lift and a lower pivot end pivotally connected to the slide. In addition, the apparatus includes an actuator connected between the base and the slide for sliding the slide along the base thereby pivoting the brace and the lift with respect to the base to selectively raise and lower the lifting end of the lift to raise and lower the object.

In yet another aspect, the present invention includes a method of lifting an aircraft having a fuselage and landing gear extending from the fuselage including snow skis using a jack apparatus. The method comprises positioning the apparatus between the snow skis of the aircraft and actuating the apparatus to lift the aircraft.

Other aspects of the present invention will be in part apparent and in part pointed out hereinafter.

BRIEF DESCRIPTION OF THE DRAWINGS

FIG. 6 is an elevation of the slide of the jack apparatus.

FIG. 7 is a perspective of a brace of the jack apparatus.

Corresponding reference characters indicate corresponding parts throughout the several views of the drawings.

DETAILED DESCRIPTION OF THE INVENTION

Figure 1:
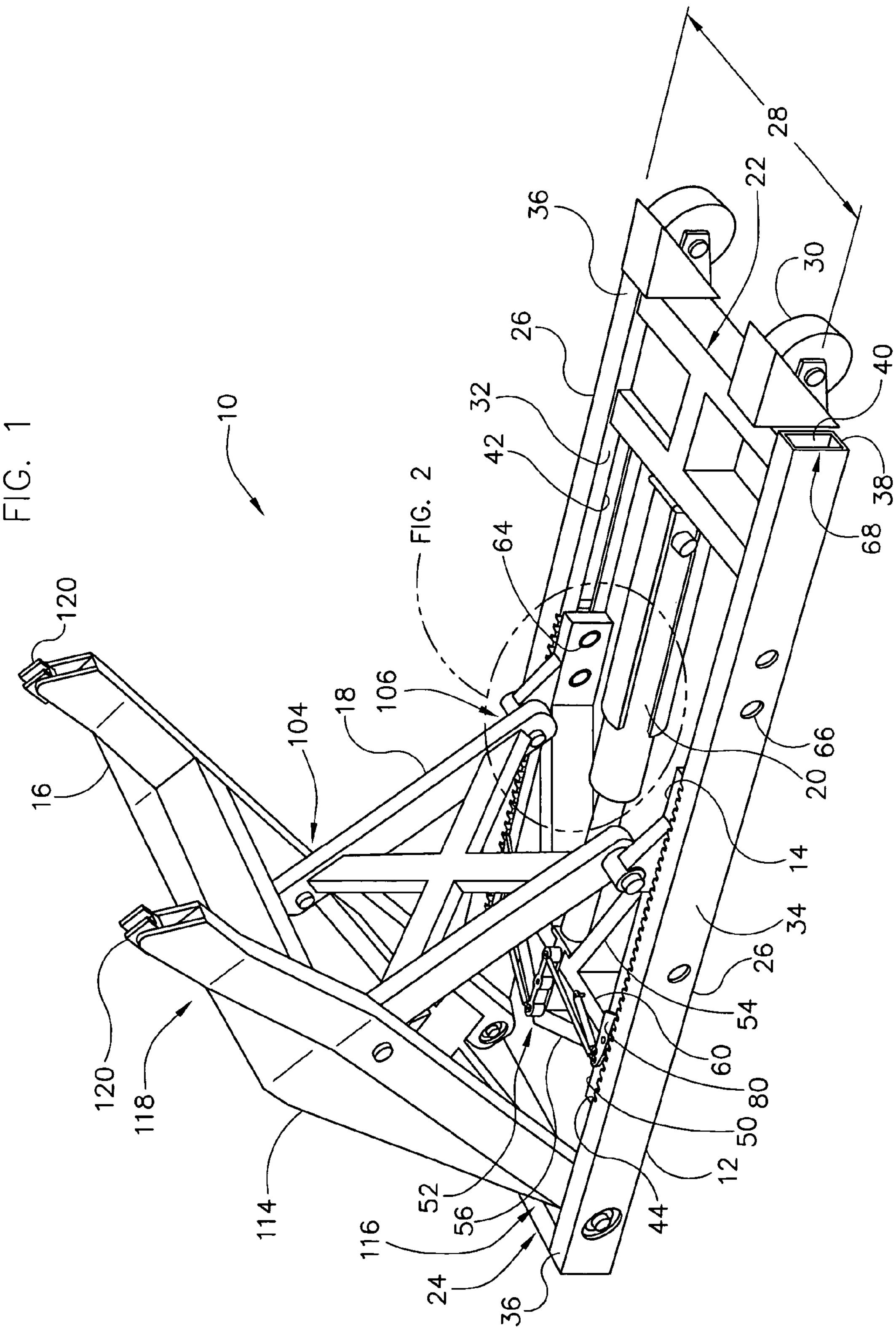
FIG. 1 is a perspective of a jack apparatus according to the present invention.

The present invention relates to a jack apparatus, and more particularly to a jack apparatus for lifting an aircraft having snow skis. Although the apparatus, methods, and systems of the present invention are primarily discussed with reference to lifting aircraft, they may be applied to lift other products without departing from the scope of the present invention. Referring now to the figures, and more particularly to FIG. 1, a jack apparatus or jack according to a first embodiment of the present invention is designated in its entirety by reference number 10. The jack 10 includes a base 12, a slide 14 slidably connected to the base, a lift 16 pivotally connected to the base, and a brace 18 pivotally connected to the slide and the lift. The jack 10 further includes an actuator 20 connected to the base 12 for driving the slide 14 along the base. During use of the jack 10, the actuator 20 slides the slide 14 along the base 12, causing the brace 18 and lift 16 to pivot with respect to the base for lifting an aircraft (not shown in FIGS. 1-8).

In one embodiment, the base 12 is generally rectangular in shape and includes a first end 22, a second end 24 opposite the first end, and at least two lateral members 26 extending between the first and second ends. The base 12 is sized and shaped for positioning between snow skis of aircraft landing gear. Although the base 12 may have other total widths without departing from the scope of the present invention, in one embodiment the base has a total width 28 of between about 30 inches and about 32 inches. The jack 10 can include two or more wheels 30 connected to the base 12 for facilitating transport of the jack. In one embodiment, the wheels 30 are connected to the base adjacent its first end 22 as shown in FIG. 1.

Figure 2:
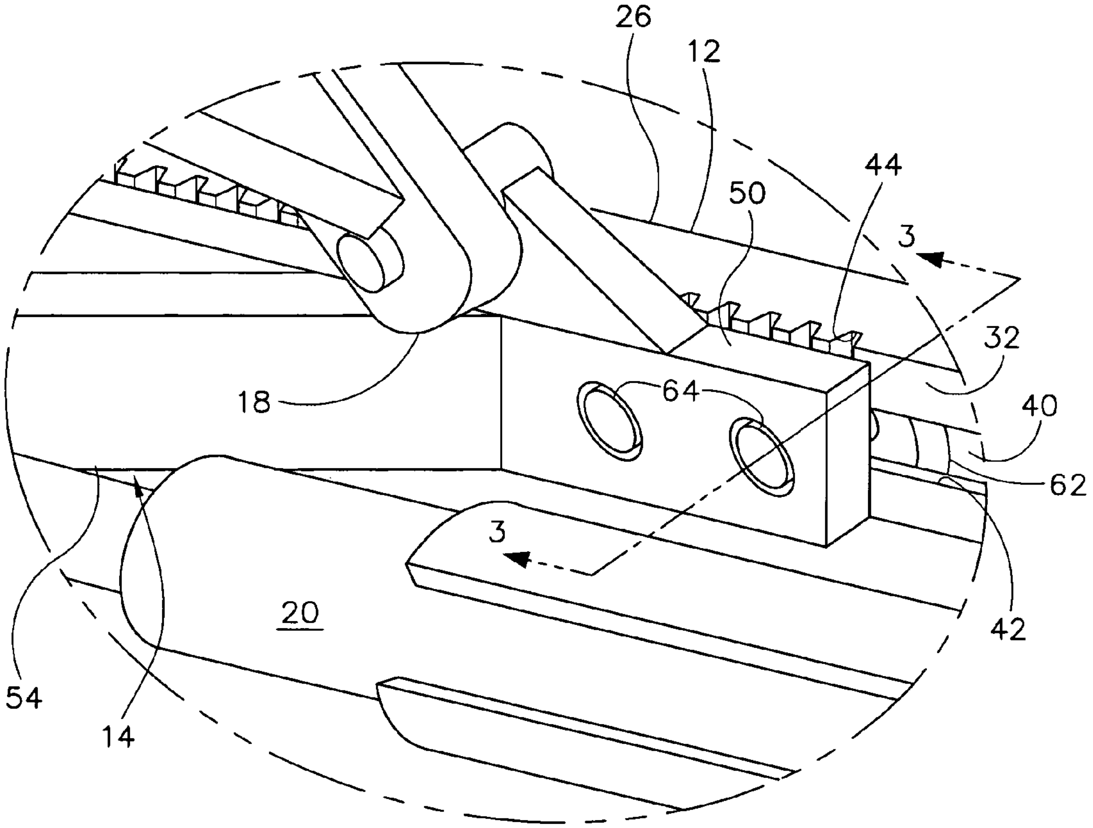
FIG. 2 is an enlarged perspective of a section of the jack apparatus as identified in FIG. 1.
Figure 3:
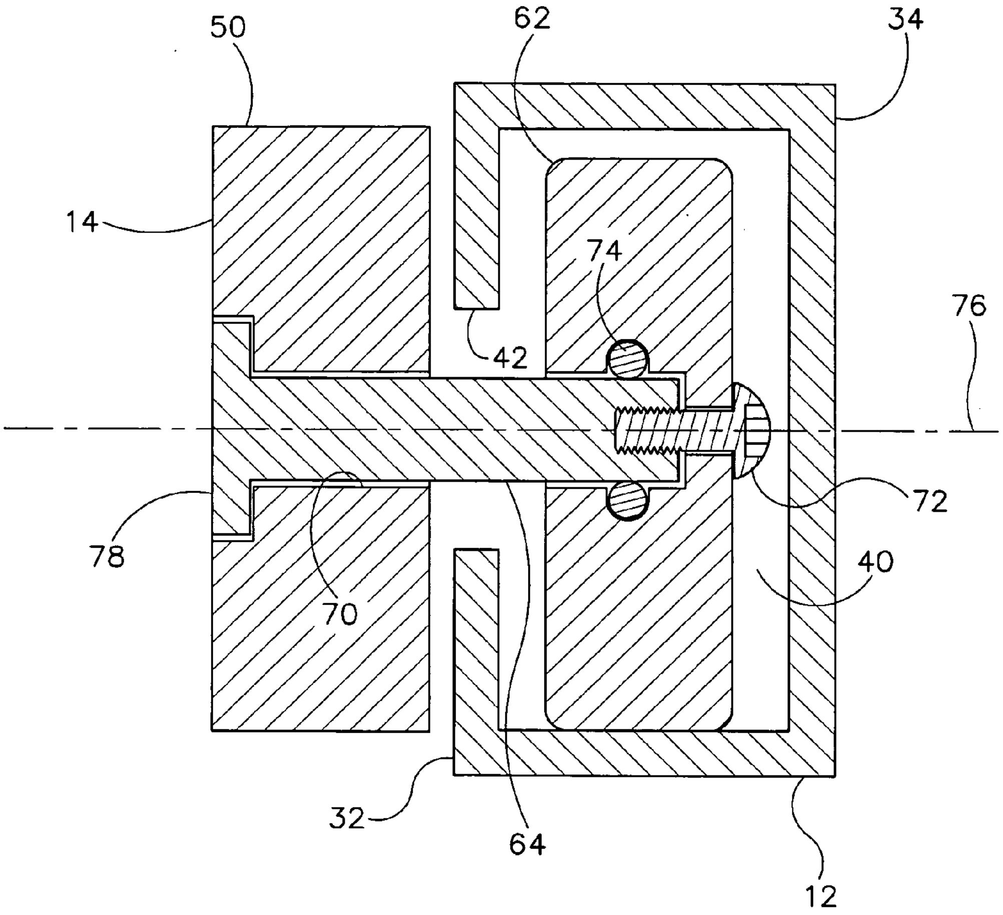
FIG. 3 is a cross section of a slide and a base of the jack apparatus taken along line 3-3 of FIG. 2.
Figure 4:
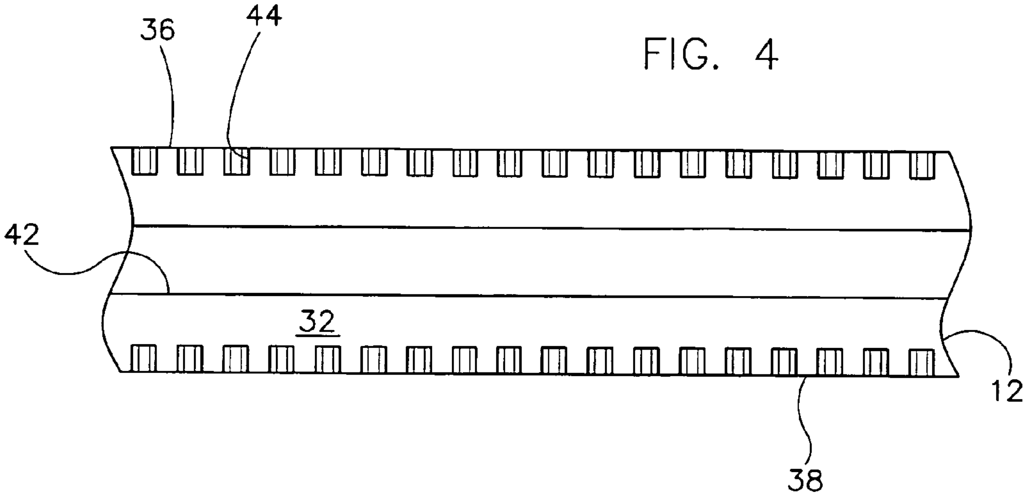
FIG. 4 is an elevation of an inner side of the base of the jack apparatus.

Each lateral member 26 of the base 12 has an inner side 32, an outer side 34 opposite the inner side, a top 36, and a bottom 38 opposite the top. The inner and outer sides 32, 34 and top 36 and bottom 38 are spaced from each other by a hollow cavity 40, as shown in FIG. 3. As shown in FIG. 2, each inner side 32 has a slot 42 and a series of notches 44 positioned above and below the slot. The slots 42 can have various shapes (e.g., V-shaped or U-shaped) without departing from the scope of the present invention. Moreover, the notches 44 may have various depths and heights without departing from the present invention. For example, in one embodiment the upper and lower notches 44 extend from the top 36 and bottom 38 of the base lateral members 26 to less than halfway to the slot 42, as shown in FIG. 4. In another embodiment (not shown), the notches 44 extend from the top 36 and the bottom 38 of the lateral members 26 all the way to the slot.

Figure 5:
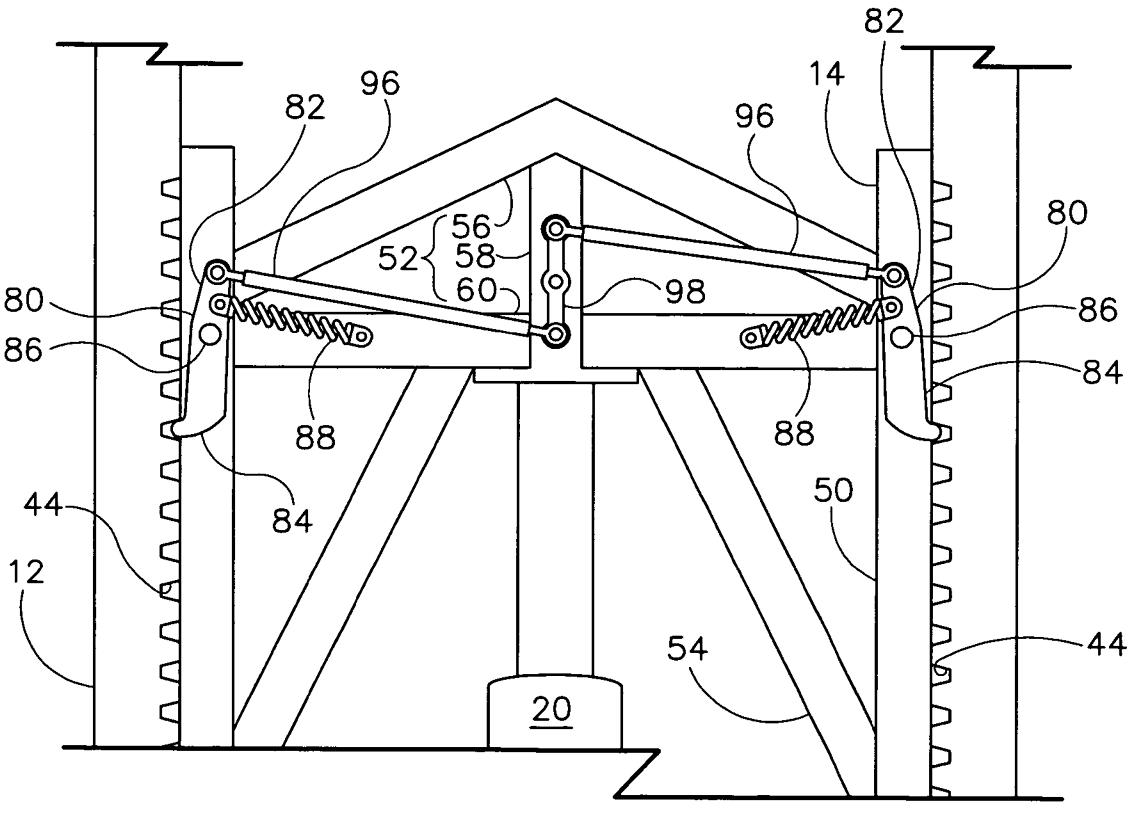
FIG. 5 is a top plan of a portion of the slide and base of the jack apparatus.

As illustrated in FIG. 5, the slide 14 includes side rails 50, a head 52 extending between the side rails, and struts 54 extending between the head and the rails. In one embodiment, the head 52 is generally triangular and includes a leading member 56 extending between the rails 50, a central member 58, and cross members 60 extending between the central member and the rails, as shown in FIGS. 1 and 5. The slide 14 may have other shapes without departing from the scope of the present invention. As shown in FIG. 3, the slide 14 further includes rollers 62 positioned in the slots 42 of the base 12 and rotatably connected to the rails 50 of the slide by way of axles 64 extending through the slots. In one embodiment, the slide 14 has six rollers 62, two positioned adjacent an intersection of the struts 54 and the rail 50 and one positioned adjacent an intersection of the head 52 and the rail on each side of the slide. Thus, three rollers 62 are positioned within each cavity 40 of the base 12. Other numbers of rollers 62 can be used without departing from the scope of the present invention. The rollers 62 lower the friction between the slide 14 and the base 12 when the slide moves with respect to the base. The outer side 34 has multiple access holes 66 (shown in FIG. 1) for attaching the rollers 62 to the slide 14 during manufacture of the jack 10 and repairing or replacing the rollers as needed during the life of the jack. For example, during manufacture, the rollers 62 can be fed into the cavity 40 through open ends 68 of the base 12 and aligned with respective holes 70 in the slide. Then, the axles 64 can be passed through the hole 70 in the slide 14 and secured to the respective rollers 62, as shown in FIG. 3. The rollers 62 can be secured to the axles 64 by fasteners 72, such as screws or bolts. As will be apparent to those skilled in the art, various type of rollers, axles, and connections can be used without departing from the scope of the present invention. For example, the roller 62 shown in FIG. 4 includes bearings 74 to facilitate rotation of the roller about the axle 64. Also, the axle 64 may be shaped to prohibit its rotation with respect to the slide 14 about its axis 76 when it is positioned in the hole 70. For instance, the axle 64 can include protrusions (not shown) corresponding to indentions (not shown) in the slide 14 or a head portion 78 of the axle 64 can be hex shaped (not shown) corresponding to a hex shaped opening (not shown) of the slide hole 70.

As illustrated in FIG. 6, the slide 14 further includes multiple pawls 80 rotatably connected thereto. Each pawl 80 has a tail 82 and a head 84 and rotates about a pin 86. Each pawl 80 is biased by a tension spring 88 attached to the pawl adjacent its tail 82 so the head 84 is forced toward the notches 44. In one embodiment, instead of tension springs attached to the pawl 80, compression springs (not shown) are attached to the pawls adjacent their head 84 to bias the heads toward the notches 44. A top pawl 90 and a bottom pawl 92 of the multiple pawls 80 comprise a pawl set 94, as shown in FIG. 6. The slide 14 includes at least two pawl sets 94, one connected to each side rail 50. Corresponding top and bottom pawls 90, 92 are connected to each other by the pin 86 so they rotate together. Each set of pawls 94 is connected to a link 96 and each link is connected to a bell crank 98. When the bell crank 98 is rotated, the links 96 move in generally opposite directions causing the corresponding pawl sets 94 to rotate in opposite directions. The bell crank 98 is connected to a release (not shown), by which an operator can turn the crank for moving the pawl heads 84 away from the notches 44 and allowing the lift 16 and brace 18 to be lowered. In one embodiment, the release includes a release cable. In another embodiment, the release is remote from the jack 10, allowing remote release of the pawls 80 from their engaged position.

As shown in FIG. 7, the brace 18 of the jack 10 includes two side bars 100 and a support structure 102 extending between the bars. The support structure 102 can comprise one or more components. When assembled, an upper pivot end 104 of the brace 18 is pivotally connected to the lift 16 and a lower pivot end 106 of the brace is pivotally connected to the slide 14, as shown in FIG. 1. As will be appreciated by those skilled in the art, the brace 18 may be pivotally connected to the slide 14 and lift 16 in many ways. For example, the brace 18 may be pivotally connected to the slide 16 and lift 16 by axle and bearing systems (not shown in detail).

Figure 8:
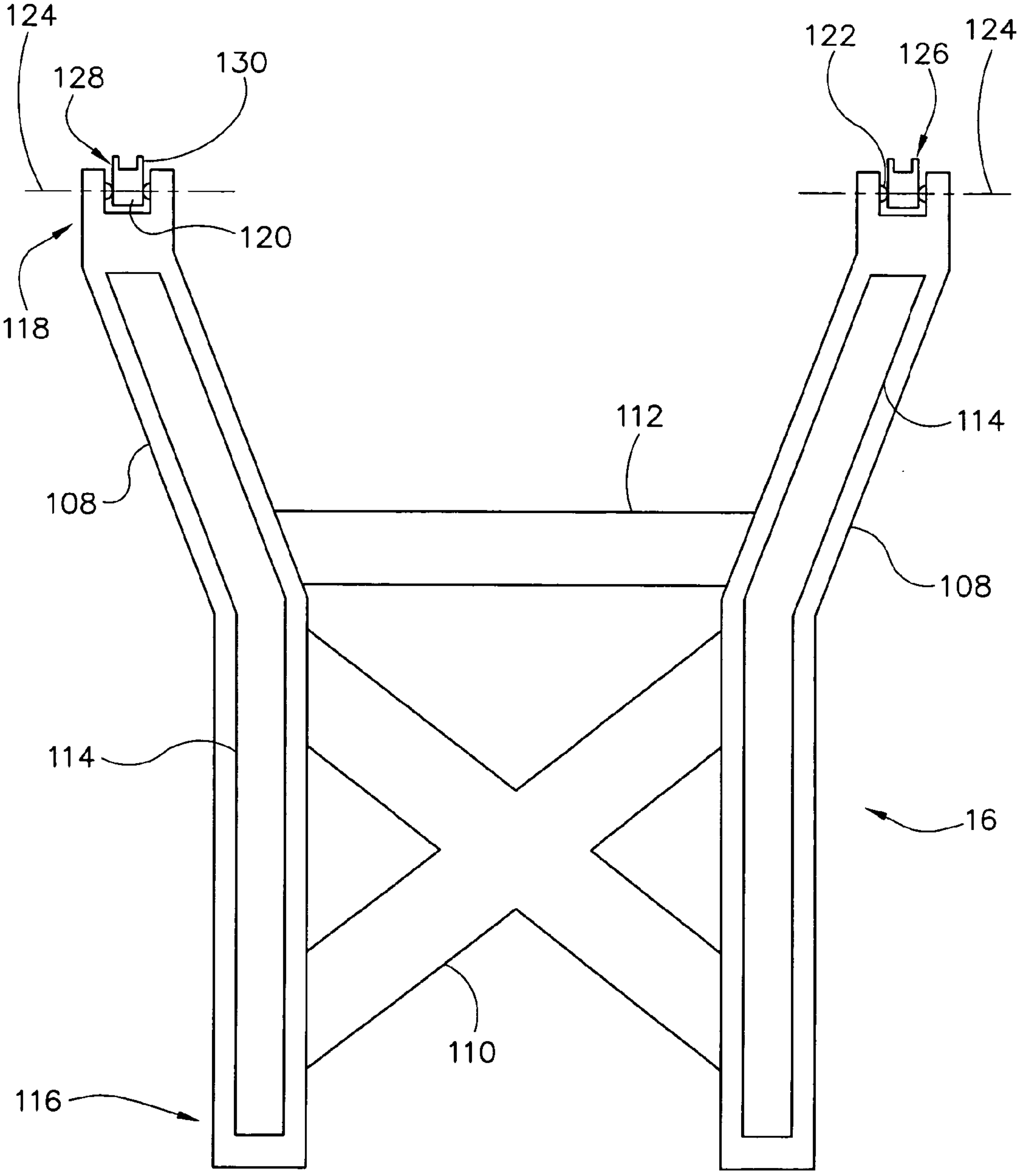
FIG. 8 is a top plan of a lift of the jack apparatus.

As shown in FIG. 8, the lift 16 includes two arms 108 and a lower support structure 110 and an upper support structure 112 extending between the arms. The lower support structure 110 can include one or more components. The lift 16 further includes a spine 114 on top of each arm 108. The spine 114 strengthens the lift 16 for lifting the aircraft. In assembly, the lift 16 has a base end 116 pivotally connected to the base 12 adjacent its second end 24 and a lifting end 118 opposite the base end. The lift 16 may be connected to the base 12 in many ways. For example, the lift 16 may be connected to the base 12 by axle and bearing systems (not shown in detail). The lift 16 further includes two interface elements 120 pivotally connected to the arms 108 adjacent the lifting end 118 for contacting the aircraft during operation of the jack 10. The interface elements 120 are pivotable about multiple axes of rotation. For example, the interface elements 120 can be connected to arms by way of ball-and-socket joints 122, which allow the interface elements to rotate about infinite axes. The ability of the interface elements 120 to rotate about a primary axis 124, generally perpendicular to sides of the lift 16 adjacent the interface elements, allows contact surfaces 126 of the interface elements to stay in contact with the aircraft during lifting as the angle between the lift and the aircraft changes. The ability of the interface elements 120 to rotate about axes other than the primary axis 124 allows the interface elements to stay in contact with the aircraft during lifting wherein one side of the aircraft is higher than the other. For example, when an aircraft has a flat tire on only one side, a first interface element 120 of the two interface elements that is on the side of the flat tire may contact the aircraft before a second other interface element. Thus, the surface of the aircraft that the first interface element 120 contacts will be angled from a standard position it would be in if the landing gear were level. Rotating about the multiple axes accommodates such anomalies in contact conditions between the left and right sides by allowing the interface elements 120 to tilt from side to side to ensure good contact with the aircraft. Also, the ability of the interface elements 120 to rotate about multiple axes allows the jack 10 to stay in contact with the aircraft in the event the aircraft sways slightly during lifting or while lifted.

The interface elements 120 are sized, shaped, and spaced to correspond to mooring or jack points on the aircraft. For example, many helicopters have two jack points, to which the interface elements 120 correspond and contact during operation of the jack. The interface elements 120 may also have pin holes (not shown) in lateral sides 128 of ears 130 extending from each interface element that correspond to pin holes and/or pins of the aircraft jack points. Thus, for example, when the interface elements 120 are positioned adjacent the jacking points, a pin secured to the aircraft can be placed through pin holes of the interface elements to fortify the connection between the jack and the aircraft.

The lift 16 is sized and shaped to avoid contact with the aircraft "A" (shown in FIG. 9) other than between the interface elements 120 of the jack 10 and the jack points of the aircraft. For example, for some aircraft "A", the jack points (not shown) are positioned on a fuselage "F" of the aircraft substantially above a position of snows skis "S", which are attached to the landing gear "L". To accommodate this arrangement, the lift arms 108 can be bowed so the arms are closer to each other at the base end 116 and farther apart at the lifting end 118, as shown in FIG. 8. Having bowed lift arms 108 allows the jack to be positioned under the aircraft "A" so the lifting end 118 of each arm is positioned at least partly above a respective snow ski "S". From that position, the lift arms 108 can pivot upward until they contact the aircraft "A" without interfering with the snow skis "S". As another example of how the lift 16 can be sized and shaped to avoid contact with the aircraft "A", the upper support structure 112 can be positioned between the lift arms 108 so the buttress does not contact the aircraft and any items "I" that may hang therefrom, such as weaponry, when the jack 10 is operated. The shape (e.g., bowed) of the lift arms 108 may also be designed to avoid contact with the aircraft "A" and any items "I" depending therefrom.

Figure 9:
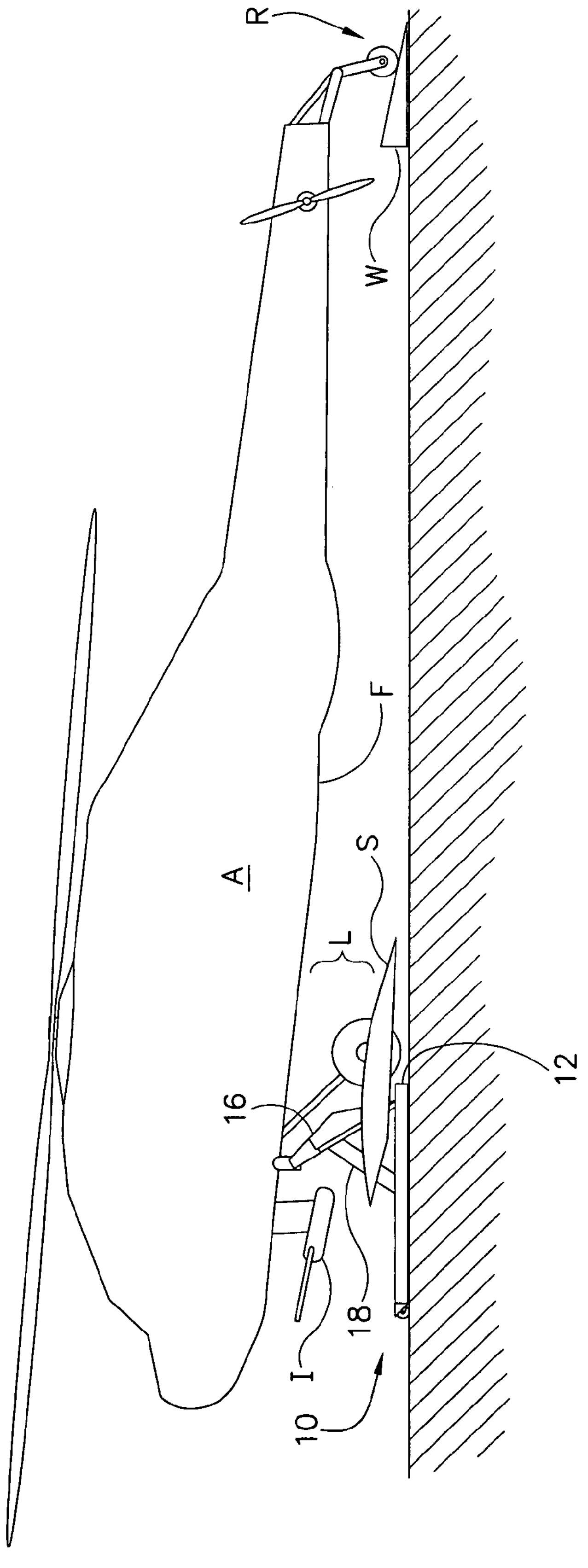
FIG. 9 is an elevation of an aircraft being lifted by the jack apparatus according to the present invention.

The actuator 20 includes a stationary body 132 connected to the base 12 adjacent its first end 22 and a ram 134 slidably disposed within the body in. In one embodiment, the actuator body 132 constitutes the first end of the base 12. Although the actuator 20 may be other types without departing from the scope of the present invention, in one embodiment the actuator is a hydraulic actuator. In another embodiment (not shown), the actuator 20 is a: screw type actuator having a screw that pushes against the slide 14 to slide the slide along the base 12 during operation of the apparatus. The actuator 20 further includes controls (not shown) for operating it. For example, the actuator 20 can be connected to a hydraulic hand pump or an electrically powered hydraulic pump. In one embodiment, the controls are remote from the actuator 20, allowing remote control thereof. During operation of the jack 10, after an operator actuates the actuator 20 by way of the controls, the ram 134 extends with respect to the body 132 and pushes against the slide 14 causing it to move along the base toward the second end 24 thereof. Specifically, in one embodiment, the ram 134 pushes directly against the central member 58 of the slide 14. When the slide 14 moves away from the first end 22 of the base 12, the lower pivot end 106 of the brace 18 pivots with respect to the slide and the upper pivot end 104 of the brace pivots with respect to the lift 16. Thereby, the lift 16 pivots with respect to the base 12 until the interface points 120 contact the jacking points of the aircraft "A", as shown in FIG. 9. As the jack 10 continues to be actuated after it contacts the aircraft, it lifts the aircraft "A". The aircraft "A" may include a rear wheel "R", which may be movable or locked during the jacking process. The rear wheel "R" may be placed on a wedge "W" to facilitate motion and/or stability of the rear wheel.

As the slide 14 advances along the base 12 from the first end 22 to the second end 24 in response to force from the actuator 20, the pawl heads 84 sequentially move into and out of the notches they pass. If one of the jack 10 components fails, each pawl would lock-in the notch that its head 84 is disposed in at the time, or into the next notch toward the first end 22 of the base 12 if the pawl is between notches, due to the spring force biasing the pawls to engage the notches. To lower the jack 10, the pawls 80 are removed from their engaged position by way of the release and the ram 134 is slowly retracted into the body 132 of the actuator. This allows the slide 14 to move toward the first end 22 of the base 12 and the brace 18 to pivot with respect to the slide 14 and the lift 16 so the lift pivots toward the base and away from the aircraft "A".

As will be appreciated by those skilled in the art, the jack 10 can be made of various materials. For example, the base 12 can be made of steel, the slide 14 can be made of steel, the lift 16 can be made of aluminum, and the brace 18 can be made of aluminum. Considerations used to select materials include strength, weight, and cost.

In use with the aircraft "A" shown in FIG. 9, a user first positions the jack apparatus 10 between the skis "S". The user further positions the jack 10 so the interface elements 120 will contact the jacking points of the aircraft "A" as best possible when the jack is raised. For example, when the jack 10 is level but the jacking points of the aircraft "A" are not level with each other, the jack will interface with one of the jacking points before the other as the jack is raised. Thus, in this situation, the user should position the jack 10 so one of the interface elements 120 will contact its corresponding jacking point first and the other interface element will contact its corresponding jacking point as the uneven condition of the aircraft "A" is corrected as the lift 18 of the jack 10 raises. The user should also ensure an adequate clearance exists between the jack 10 and the aircraft "A". For example, the user should ensure the upper member 112 and lifting end 118 of the lift 16 will not contact any items "I" hanging from the aircraft during operation of the jack 10. Once the jack 10 is properly positioned, the actuator 20 can be actuated to raise the lift 16 of the jack as described above. After the interface elements 120 contact the aircraft "A" and the actuator 20 continues to raise the lift 16, the aircraft is lifted.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A jack apparatus for lifting aircraft having a fuselage and landing gear extending from the fuselage including snow skis, the apparatus comprising:

a generally elongated base having a first end, a second end opposite the first end, and at least two lateral members extending between the first and second ends, each lateral member of the base having an inner side including a slot therein, and an outer side opposite the inner side and spaced from the inner side by a hollow cavity, said base being sized and shaped for positioning between the snow skis of the landing gear;

a lift having a base end pivotally connected to the base adjacent its second end and a lifting end opposite the base end;

a slide slidably connected to the base, the slide having at least two axles extending through the slots in the inner sides of the lateral members and at least four rollers, at least one of said rollers being positioned in each of said hollow cavities formed in the lateral member of the base;

a brace having an upper pivot end pivotally connected to the lift and a lower pivot end pivotally connected to the slide; and an actuator operatively connected between the base and the slide for sliding the slide along the base thereby pivoting the brace and the lift with respect to the base to selectively raise and lower the lifting end of the lift to raise and lower the aircraft.

2. An apparatus as set forth in claim 1 wherein the inner side of each lateral member has a series of notches above and below the slot, and wherein the slide includes at least two sets of pawls rotatably connected thereto, each pawl being positioned to engage one of said series of notches and being biased toward the series of notches to hold the apparatus in a raised position.

3. An apparatus as set forth in claim 2 wherein a top pawl and a bottom pawl of each set of pawls are connected to each other so they rotate together.

4. An apparatus as set forth in claim 2 wherein each set of pawls is connected to a link and each link is connected to a bell crank so that all the pawls rotate together.

5. An apparatus as set forth in claim 4 wherein, when the bell crank is rotated, the respective links move in generally opposite directions causing the corresponding pawl sets to rotate in opposite directions.

6. An apparatus as set forth in claim 1 further comprising transport wheels rotatably connected to the base adjacent its first end.

7. An apparatus as set forth in claim 1 wherein the actuator is a hydraulic actuator having a ram that pushes against the slide to slide the slide along the base during operation of the apparatus.

8. An apparatus as set forth in claim 1 wherein the actuator is a screw type actuator having a screw that pushes against the slide to slide the slide along the base during operation of the apparatus.

9. An apparatus as set forth in claim 1 wherein the actuator is remotely controlled.

10. An apparatus as set forth in claim 1 further comprising at least two interface elements pivotally connected to the lifting end of the lift for contacting the aircraft during operation of the apparatus.

11. An apparatus as set forth in claim 10 wherein the interface elements are pivotable about multiple axes of rotation.

12. An apparatus as set forth in claim 1 wherein the base has a total width of between about 30 inches and about 32 inches.

13. The jack apparatus of claim 1, wherein the lift includes an interface element pivotally coupled to the lifting end of the lift, the interface element having ears extending outward from the interface elements, the ears configured to securably engage an attachment point on the aircraft.

* * * * *